United States Patent [19]

Weber

[11] 4,191,804

[45] Mar. 4, 1980

[54] COATING COMPOSITION

[75] Inventor: Hermann P. Weber, Tarzana, Calif.

[73] Assignee: Techsight Corp., Chatsworth, Calif.

[21] Appl. No.: 920,669

[22] Filed: Jun. 30, 1978

[51] Int. Cl.$^2$ .................. G02B 1/10; B32B 27/42; C08J 7/04; C08L 61/28
[52] U.S. Cl. .................. 428/409; 260/29.1 SB; 260/29.2 M; 260/29.4 R; 260/375 B; 351/166; 428/412; 428/447; 428/502; 428/505
[58] Field of Search ............ 428/412, 447, 451, 502, 428/505, 409; 260/29.1 SB, 29.2 M, 29.4 R, 375 B; 351/166; 427/385 R, 385 B, 387, 372 A

[56] References Cited

U.S. PATENT DOCUMENTS

| 3,329,738 | 7/1967 | Hill et al. | 428/412 X |
|---|---|---|---|
| 3,935,346 | 1/1976 | Stengle et al. | 427/372 X |
| 3,986,997 | 10/1976 | Clark | 428/412 X |
| 4,006,271 | 2/1977 | French | 428/412 X |
| 4,027,073 | 5/1977 | Clark | 351/166 X |
| 4,103,065 | 7/1978 | Gagnon | 428/412 X |
| 4,127,697 | 11/1978 | Laurin | 351/166 X |

Primary Examiner—Harold Ansher
Attorney, Agent, or Firm—George F. Bethel; Patience K. Bethel

[57] ABSTRACT

An improved pigment-free abrasion resistant coating composition for plastic substrates which is particularly suited for the protective coating of optical lenses formed from synthetic polymers such as acrylics, polyesters, polycarbonates, and the like. The coating composition is characterized by significantly improved adhesive qualities over prior art materials. The composition includes a major amount of a pigment-free aqueous composition comprising a dispersion of colloidal silica in a lower aliphatic alcohol-water solution of the partial condensate of a silanol of the formula $RSi(OH)_3$ in which R is selected from the group consisting of alkyl radicals of 1 to 3 inclusive carbons, the vinyl radical, cyanoethyl radical, the 3,3,3-trifluoropropyl radical, the gamma-glycidoxypropyl radical, at least 70 weight percent of the silanol being $CH_3Si(OH)_3$, said composition containing 10 to 50 weight percent solids consisting essentially of 10 to 70 weight percent colloidal silica and 30 to 90 weight percent of the partial condensate, said composition containing sufficient acid to provide a pH in the range of about 3 to about 6; and, based on the above solids from about 3.5% to about 20% by weight of a pigment-free resin selected from the group consisting of amino resins and amino resins which have been at least partially alkylated with at least one aliphatic alcohol having from 1 to 8 carbons and mixtures thereof. Examples of resins to be added to the partial silanol condensate and colloidal silica composition are urea-formaldehyde resins, melamine-formaldehyde resins and the corresponding methylated resins. The invention also includes plastic materials having the above cured coating compositions thereon.

16 Claims, No Drawings

COATING COMPOSITION

BACKGROUND OF THE INVENTION

1. Field of the Invention

This invention relates to the field of pigment free coating compositions and particularly to such compositions which are suitable for providing abrasion resistant coatings to plastic substrates. The composition of the invention is particularly suited for the coating of optic lenses wherein the cured coating composition exhibits excellent adhesion to the plastic surface.

2. Description of the Prior Art

In recent years there has been considerable interest in the formation of materials out of plastic which were formerly made from glass, in order to provide the shatter resistant characteristics which are provided by plastics. Examples of such use include, for example, large plastic sheets for use as window panes, decorative mirrors for use in buildings and other architectural panels, various parts of automobiles, such as reflectors and windshields, lighting signs, packaging in aircraft, as machine guards, view ports, particularly in the field of safety glasses, helmets, face guards and opthalmic or optical lenses.

The plastic materials which are available for the above uses must be pigment-free with a high visible light transmission after molding or casting. Examples of such plastics include, among others, acrylics, polyesters, polycarbonates, polyamides, copolymers of acrylonitrile-styrene, styrene-acrylonitrile-butadiene copolymers, polyvinylchlorides, butyrates, polyethylene, and the like.

The above mentioned plastics are all characterized by varying degrees of impact resistance, weatherability, chemical resistance, hardness and other desirable qualities which would be selected on the basis of their final use. It has been found that all of these plastics suffer from the undesirable characteristic of varying degrees of scratch and abrasion resistance.

In an attempt to overcome these undesirable characteristics of the plastics, various coating compositions have been tried in an effort to impart improved abrasion resistance to the surface of these materials. Perhaps the best available composition which has been used is a pigment-free coating composition, which is the subject of U.S. Pat. No. 3,986,997 to Harold A. Clark. This composition combines a colloidal silica hydrosol containing very small particles of colloidal silica in the range of about 10 to 30 millimicron particle size with a lower aliphatic alcohol-water solution of the partial condensate of a silanol, preferably monomethyltrisilanol, and sufficient acid to give a pH in the range of about 3 to about 6. The composition contains approximately 10 to about 50 weight percent solids of which 10 to 70 percent is comprised of the colloidal silica and 30 to 90 weight percent is comprised of the silanol partial condensate. The solvent system for the above mentioned composition includes from about 20 to about 75 weight percent alcohol with preferably 50 weight percent isopropanol in the mixture. Water is present in the composition through the silica hydrosol and through condensation of the silanol.

The composition as above described is coated onto plastic materials by any conventional method, such as by flowing, spraying, or dip-coating to form a continuous surface film. After coating, the plastics are air dried and then cured by baking at a temperature which is consonant with the plastic material which is to be coated.

The coating thus formed on the plastic is characterized by excellent abrasion resistance, but suffers from a very serious drawback in that adhesion of the coating to the plastic material is very difficult to obtain. Adhesive problems are related to the type of plastic and are particularly acute when the plastic material to be coated is polycarbonate. Polycarbonate plastic is particularly favored for the production of optic lenses, due to its clarity coupled with particularly high impact resistance, chemical resistance, and toughness. Unfortunately, it is quite difficult to obtain adherence between polycarbonate plastics and the above described abrasion resistant coating composition.

The problem of adhesion to polycarbonate plastics is well recognized as discussed in the U.S. Pat. No. 3,986,997. It has been suggested that such adhesion might be improved by pretreatment of the polycarbonate plastic surfaces by overnight soaking in an alkaline solution, for instance a ten percent aqueous solution of potassium hydroxide. This step has not been found to be successful in providing the desired degree of adhesion of the abrasion resistant coating on the polycarbonate surface.

It has also been suggested to improve adhesion by priming polycarbonate with a five percent solution of a silane-modified epoxy in "Dowanol-EM" and allowing to air dry. The recommended epoxy primer is a mixture of about twenty percent beta-aminoethylgamma-aminopropyltrimethoxy silane, in a commercially available liquid epoxy sold under the trademark "DER-331" by the Dow Chemical Company. This priming step, which acts as a coupling agent between the plastic substrate and the abrasion resistant coating has not been found to provide satisfactory adhesion between the coating composition and the polycarbonate.

Satisfactory adhesion is measured by applying a strip of "3 M Scotch" No. 650 brand adhesive tape onto a one eigth inch cross hatched grid of the cured coating and rapidly pulling the tape up and off of the plastic surface. Where there is a problem in adhesion, it can be readily seen where the coating has been pulled off of the surface of the lens.

The fact that the plastics to be coated are valued for their clarity, or light transmission, makes the surface preparation of such plastics prior to application of an abrasion resistant coating a difficult one. Any surface preparation which is to be done to the plastics prior to coating with the abrasion resistant composition must be of a minimal nature so that the light transmission for which the plastic is selected, is not interfered with. This can be particularly serious when such plastics are exposed to chemicals which etch the plastic or attack the surface of the plastic. Additionally, any priming coating, such as the epoxy silane mixture mentioned above, must be of a clear pigment-free nature which will not cause a reduction in the clarity of the final coated lens. In effect, the commonly used methods for improving adhesion between dissimilar surfaces, such as roughening the surface or the application of coupling agents is fairly limited.

Until the present time, there has been no satisfactory means of improving the adhesion properties of the coloidal silica-silanol partial condensate described above, without interfering with the light transmission of the plastic material to be coated.

DESCRIPTION OF THE INVENTION

It has now been found that the addition of minor amounts, from about 3.5% to about 20% of a resin selected from amino resins and amino resins which have been at least partially alkylated with at least one aliphatic alcohol having from one to eight carbons, and mixtures thereof to the colloidal silica-silanol partial condensate coating composition, provides the desired adhesion between the abrasion resistant composition and the plastic surface. This is particularly evident in the improved adhesion to polycarbonate surfaces, without interfering with the light transmission thereof.

The colloidal silica-silanol dispersion forming a major portion of the improved coating composition of this invention is discussed in detail in U.S. Pat. No 3,986,997. The basic coating composition is formed by a dispersion of colloidal silica in an alcohol-water solution of a partial condensate of a silanol.

The silanols forming the partial condensate of the invention composition include those having a formula $RSi(OH)_3$ in which R is selected from the group consisting of alkyl radicals of 1 to 3 inclusive carbon atoms, the vinyl radical, the cyanoethyl radical, the 3,3,3-trifluoropropyl radical, the gamma-glycidoxypropyl radical. Mixtures of the above silanols can be employed, but at least 70 weight percent of the silanol should be monomethyltrisilanol. Best results are obtained using all monomethyltrisilanol in making the partial condensate of the invention.

The partial condensates can be generated in situ by adding the corresponding trialkoxysilane to acidic aqueous dispersions of colloidal silica. Upon contact with water, the silanes are hydrolyzed to the corresponding silanols. This provides not only the partial condensate but also a portion of the alcohol present in the final coating composition.

As an example, trialkoxysilanes which can be employed include among others those which contain methoxy, ethoxy, isopropoxy and tert-butoxy substituents.

Condensation of the hydrolyzed silanes to silanols is incomplete, so that the resulting polymer remains soluble in the water-alcohol cosolvent system. The resulting partial condensate can be described as a siloxanol polymer having at least one silicon-bonded hydroxyl group for every three-SiO-units when the coating composition is subjected to cure conditions, such as baking at appropriate temperatures. During cure, the residual hydroxyl groups condense to give a silsesquioxane $RSiO_{3/2}$.

As will be explained subsequently in greater detail the amino resin additive which improves the adhesion of this coating interacts with the silanol to co-condense and form a cross-linked structure.

The coating composition also includes colloidal silica. Colloidal silica is a dispersion of very small particles of silica which have a particle size in the range of about five to about one hundred and fifty millimicrons in diameter. Preferably, a particle size in the range of approximately ten to about thirty millimicrons is preferred in order to provide dispersions having the greatest stability, as well as coatings having the desired superior optical properties. Preferably, the silicas are relatively free of $Na_2O$ and other alkali metal oxides and generally contain less than two weight percent and preferably less than one weight percent of the $Na_2O$. The hydrosols or colloidal silicas are commercially available as either acidic or basic hydrosols. Examples of such commercially available products include those sold under the registered trademark "Ludox" and "Nalcoag".

The invention is not meant to include colloidal silica such as non-particulate polysilicic acid or alkali metal silicate solutions which are not operable in this invention.

The hydrosol as above described is dispersed in an alcohol-water solution of the siloxanol. The alcohol-water cosolvent system is preferably comprised of about twenty percent to about seventy five percent by weight of the alcohol. It has been found that in this range solubility of the siloxanol is assured. Examples of lower aliphatic alcohols which can be utilized include among others, methanol, ethanol, isopropanol, and t-butyl alcohol. Good results have been obtained utilizing mixtures of the above alcohols, particularly when isopropanol constitutes at least fifty weight percent of the total alcohol in the mixture.

If desired, a water-miscible polar solvent, for example, acetone or butylcellosolve can be included in the solvent in an amount of up to about twenty weight percent of the cosolvent system.

The hydrosol and the partial silanol condensate constitute the non-volatile solid portion of the coating composition and are preferably included in the amount of ten to fifty weight percent solids of which about ten percent to about seventy weight percent is comprised of the colloidal silica and about thirty to about ninety weight percent is comprised of the partial condensate of the silanol.

Stability of the silica hydrosol-silanol partial condensate is maintained at a pH level in the range of from about 3.0 to 6.0. Most preferably, a pH in the range of 4 to about 5.5 has given the best results. Adjustments of pH are preferably made with carboxylic acids rather than stronger inorganic acids, such as hydrochloric acid, or toluene sulfonic acids which shorten shelf life by accelerating condensation of the partial condensate.

The carboxylic acids which are most preferred include those selected from the group consisting of acetic, formic, propionic, and maleic acid.

Since the alkali metal salts of the above mentioned preferred carboxylic acids are soluble, silicas containing greater than approximately 0.2% $Na_2O$ or alkali metal can be employed, without precipitating the acid salts thereof.

The manner of forming the composition which is most preferred includes adding the trialkoxysilane, such as $RSi(OCH_3)_3$ to the colloidal silica hydrosol followed by adjustment of the pH to the desired level by the addition of the preferred organic acid. If the mixing is done rapidly, the acid can be added to either the silane or the hydrosol prior to mixing.

Hydrolysis of the alkoxysilane generates the corresponding alkyl alcohol. As an example, one mole of methyltriethoxy silane will generate three moles of ethanol during hydrolysis. Additional alcohol, water or a water miscible solvent can be added. Condensation of the silanol take place slowly over a period of time. Thus, for best results, the composition should be allowed to age to allow this condensation to take place. Eventually, gel structures will be formed within the composition which are undesirable prior to coating. By storing the composition after ageing, at lowered temperatures, for example 40 degrees Fahrenheit, the shelf life of the composition can be extended substantially.

If milder curing conditions are desired, such as for a plastic which would have a relatively low melting temperature, a buffered latent condensation catalyst can be added. Examples of such materials which can be employed include among others, the alkali metal salts of carboxylic acids such as potassium formate, and the amine carboxylates and quaternary ammonium carboxylates. Such catalysts should be selected on the basis of their solubility or miscibility in the system and their latency, such that they do not undesirably shorten the bath life of the composition. It is also important to consider the effects of the catalysts on the pH of the composition and for this reason, basic catalysts are preferred.

As mentioned previously, the carboxylic acids used to adjust pH react with free alkali in the hydrosol and thus regenerate the carboxylate catalysts in situ. Alternately, catalysts such as for example, dimethylamine acetate, ethanolamine acetate, sodium propionate, formate, tetraethylamonium benzoate, sodium acetate, sodium propionate, sodium formate, and benzyltrimethylammonium acetate can be used. Preferably, catalysts are employed in amounts of about 0.05% to about 0.5% by weight, though as high as 1% by weight can be used.

The most preferred range for the above mentioned materials which have been found to provide the best stability and optimum properties to the cured coating are as follows: A total weight percent in solids in the range of between ten and thirty-five percent of which the silica portion comprises sixty-five to forty-five weight percent and a particle size silica in the range of five to thirty millimicrons, the partial condensate of $CH_3Si(OH)_3$ comprising about thirt-five to about fifty-five weight percent of the total solids, the cosolvent consisting of a mixture of methanol, isopropanol and water of which thirty to sixty weight percent of the cosolvent is alcohol of which fifty percent is comprised of isopropanol; a pH in the range of 4.0 to 5.0; and a catalyst selected from the group consisting of sodium acetate and benzyltrimethylammonium acetate in an amount in the range of 0.05 to about 0.5 weight percent if a lower temperature cure is desired.

To the above described coating composition is added from about 3.5% to about 20% by weight based on the solids content of the silica-silanol dispersion of a pigment-free resin selected from the group consisting of amino resins and amino resins which have been at least partially alkylated with at least one aliphatic alcohol having from one to eight carbons, and mixtures thereof. The resin additive is dispersible in the silica-silanol dispersion. It has been found when the above described resins are added to the silica-silanol dispersion, that greatly improved adhesion is provided, especially when the coating is applied to polycarbonate surfaces.

The amino resins and their alkylated counterparts which are included in this invention are those amino resins, such as for example, urea-formaldehyde, melamine-formaldehyde, benzoquanamine-formaldehyde, ethyleneurea-formaldehyde, and glycolurea-formaldehyde.

In addition to the above mentioned amino resins, there is included in the invention the corresponding alkylated amino resins. Amino resins are condensation type thermosetting resins resulting from a reaction between formaldehyde and compounds containing amino groups. For example, urea-formaldehyde is formed from two moles of formaldehyde and one mole of urea under alkaline conditions. An equilibrium mixture is formed of monomethylol urea, dimethylolurea, and possibly some polymethylol urea, depending upon the length of time the reaction is allowed to proceed. If alkaline conditions are maintained there is a predominance of monomethylol urea. Usually amino resins are allowed to condense to an essentially monomeric or only slightly advanced stage in polymerization, to allow for solubility in water and other solvents. The liquid dispersions are usually kept at an alkaline pH in order to prevent condensation growth during storage. When this is desired, an acid or acid forming catalyst can be added to the resin solution. An ammonium salt is frequently favored which will react with uncombined formaldehyde and the terminal methylol groups of the monomeric groups to form hexamethylene-tetramine and the corresponding free acids which catalyze the reaction. A typical buffer is tricalcium phosphate. When cure takes place, the terminal methylol groups condense with the elimination of water and formaldehyde.

The alkylated amino resins are formed from the methylol derivatives in the presence of an excess of a monohydric alcohol and a strong acid catalyst. The removal of water as it is produced favors the production of the alkylated resins.

Alcohols which are most commonly used are those which are monohydric alcohols having from one to four carbons but longer chain alcohols have also been used. Thus, methanol, ethanol, isopropanol, n-butanol and sec-butanol or longer chain alcohols have been utilized.

Cure of the alkylated amino resins takes place under acid conditions and reacts by interaction with free hydroxyl groups of the amino resins by transetherification.

Since all of these ingredients are present in usually monomeric or only slightly polymeric stages, it can be seen that there are many possibilities for cross linking of the groups during cure.

Melamine formaldehyde is formed in a similar manner as that for urea. Having three reactive amino groups, it can be seen that there are more possibilities for different degrees of reaction However, the process of the reaction proceeds in the same manner as for the urea. Thus, melamine formaldehyde is formed using from one to three moles of formaldehyde under neutral conditions. Depending upon the amount of formaldehyde used one obtains methylol melamines, dimethylol melamines, and trimethylol melamines. If the formaldehyde is increased to six moles, it is a possibility for the hexamethylol melamine to develop wherein each hydrogen of the $NH_2$ group of the melamine has been replaced by a methylol group.

As with the alkylated urea formaldehyde resins a lower aliphatic alcohol, for example methanol, ethanol, butanol and isopropanol can then be added at the stage of methylol melamine formation to alkylate each of the hydroxyl groups of the methylol groups by replacement of the hydrogens with the alkyl groups of the alcohol which has been added to the reaction mixture. This reaction, as well as the formation of initial amino resins is illustrated in equations given below.

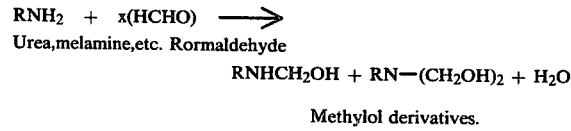

Methylol derivatives.

-continued

methanol, ethanol,    alkylated amino resins propanol, butanol, etc.

Alkylated amino resins are known as coating resins which are characterized by having low adhesion which makes it more surprising that their additions to another coating composition will improve the adhesion thereby.

The alkylated amino resins are most preferred for addition to the silica-silanol partial condensate. However, the non-alkylated amino resins also give good results. This is due to the fact that the ingredients present in the final composition, that is to say, the presence of large amounts of alcohol under acid conditions causes some alkylation of the amino resins while they are present in the composition and during cure thereof. In any event, the resins can be used almost interchangeably, although it has been found that for best results the alkylated melamine resins are most preferred and of these the methylated resins have given the best results.

Amino resins are commercially available from a number of manufacturers, for example under the trade name "Avisco," manufactured by the American Avisco Corporation for urea formaldehyde resins, "Bekamin" and "Super Bekamin" which are alcohol soluble urea formaldehyde and melamine formaldehyde resins produced by the Reichold Chemical Company, and various kinds of resins ranging from amino resins to alkylated amino resins produced by American Cyanamid Company.

If desired, the amino resins can be readily made using well known methods in the art. The chemical reactions needed for producing urea and melamine formaldehyde resins are given above. The same procedures can be used for making the corresponding formaldehyde resins using in place of the urea and melamine compounds such as, for example, guanamines, including benzoguanamines, formoguanamines, acetoguanamines and uroguanamines, thiourea and glycol urea, ethylene urea, stearoguanamine, and the like.

Aliphatic alcohols having from one to eight carbons when added to the above mentioned amino resins will provide the corresponding alkylated resins, depending upon the identity of the alcohol. It is sometimes desirable to employ mixtures of alchols. For example, alkylation alcohol mixtures consisting of methanol and ethanol, methanol and n-butanol, methanol and isobutanol, are commonly used to provide excellent results. Generally, however, the use of methanol is most commonly used, since the molecular size of the condensed compound remains smaller. However, various degrees of solvent solubility, as well as final coating characteristics can be changed by the selection of the appropriate alkylation alcohol. Generally speaking it is preferred for the purpose of this invention to use monohydric alcohols having from one to four carbon atoms, and mixtures thereof.

The amino resins and the alkylated amino resins are preferably allowed to condense to the monomeric or only slightly polyermic stage to allow for water dispersibility and compatibility with the silica-silanol partial condensate. Hence, the alkylated amino resins are referred to as being "at least partially alkylated" to distinguish them from being necessarily fully alkylated, although fully alkylated amino resins have been used and are workable in the invention. By varying the degree of condensation of the amino resin and the degree of condensation during alkylation, it is possible to produce alkylated resins having variable properties. For example, a urea formaldehyde or melamine formaldehyde resin can be reacted to a very low methylol content stage where there is a fair amount of free unreacted formaldehyde in the resin prior to alkylation. Subsequent reaction can then be with an alkylation alcohol to a point ranging from the monomeric to polymeric stage. This gives a range of the amino resins from little condensation or low methylol content to a very high methylol content and a range of alkylation throughout the same range so the the molecular size can still range from monomeric to only slightly polymerized prior to cure. The major differences of these degrees and variations in reaction affects the water solubility and solvent compatability, as well as the hardness and other film forming characteristics of the resin, such as outdoor durability and flexibility.

The chemistry and methods for making amino resins and alkylated amino resins can be found by consulting "Amino Resins" by John T. Blais, published by the Rheinhold Press, and U.S. Pat. No. 2,197,357 for making melamine formaldehyde resins and the alkylated counterparts.

Preferred alkylated amino resins for use in the present invention are commercially available from American Cyanamid Co. Melamine resins are available which have been alkylated with methanol, methanol-ethanol mixtures, methanol-butanol mixtures, methanol-isobutanol mixtures, and n-butanol; urea formaldehyde resins which have been alkylated with methanol and n-butanol; benzoguanamine resins alkyated with methanol-ethanol mixtures; and glycoluril amino resins which have been alkylated with n-butanol. These are all high solids alkylated amino resins ranging from partially alkylated to fully alkylated and having solubility which varies from water soluble and water dispersible resins extending up into more hydrophobic solubility. In most instances, the resins combine water dispersibility with organic solvent solubility.

It should be mentioned here that all of the amino resins usable in the invention are those which are clear resins with no added pigment so that they may be readily usable as a clear coating composition for optical and other types of plastic which are utilized for the purpose of transmitting light. Compatibility with the silica hydrosol-silanol partial condensate is also a requirement. Thus, in the event that the amino resins and alkylated amino resin additives are prepared they should not be polymerized past the water soluble or alcohol dispersible stage to maintain compatibility.

It is also preferred to utilize in the coating composition of the invention, the silica hydrosol-silanol partial condensate, "ARC" resin available from the Dow Corning Company and made in accordance with U.S. Pat. No. 3,986,997.

The amino resin or amino resin which has been alkylated as described above is added to the silica hydrosol-silanol partial condensate in an amount of from about 3.5% to about 20% by weight based on the solids content of the silica hydrosol-silanol dispersion.

The ingredients are mixed together in any convenient manner. However, it has been found convenient to remove a small portion of the silica hydrosol-silanol partial condensate dispersion and add the desired amount of the amino resin or alkylated amino resin to it, followed by stirring. The resulting mixture is then added to the larger quantity of the silica hydrosol-silanol partial condensate dispersion and thoroughly mixed to form a homogeneous mixture. Preferably, the amino resin or alkylated amino resin is added to a room temperature dispersion of the silica hydrosol-silanol partial condensate and stirred from twelve to twenty four hours to insure that there is a homobeneous mixture. The resulting mixture should be then stored at a low temperature, for example, forty degrees Fahrenheit to maintain stability, as all the resinous ingredients are capable of further condensation at room temperature.

Although the amino resin or alkylated amino resin is added in amounts of 3.5% by weight to about 20% by weight based on the solids content of the silica hydrosol-silanol partial condensate dispersion, best results have been achieved using 5% by weight. When less than about 3.5% is used, the desired improved adhesion is not obtained, whereas as greater amounts approaching 20% and above, gives a corresponding decrease in the average hardness unless the cure time is increased.

The exact amount within this range, of course, will depend upon the plastic surface which is to be coated. The above 5% figure has been found to be most optimum for coating polycarbonate plastic, such as "Lexan," manufactured by General Electric.

In some instances from the standpoint particularly of cost, it may be desirable to use a mixture of resins, rather than a single resin. For example, one could use one part of a methylated formaldehyde resin to four parts of a methylated urea formaldehyde resin.

While the coating composition of the invention is primarily intended for improved abrasion resistant coating on clear plastic substrates, it is apparent that it is equally usable for application to pigmented plastics as well as other materials such as wood, metal, printed surfaces, metal, glass, ceramics, textiles and the like.

The plastic substrates besides polycarbonates which are advantageously coated by the composition of the invention include among others, acrylic polymers, polesters, polyamides, polyamines, copolymers of acrylonitrile-styrene, styrene-acrylonitrile-butadiene copolymers, polyvinylchlorides, butyrates, polyethylene, and the like.

Application of the coating to the selected substrates can be done by any conventional method, such as for example, flowing spraying, diping, spin coating and the like. It is important to provide conditions which will permit a continuous film over the surface.

When the composition is to be used for the coating of plastics requiring high light transmittance and optical resolution, it is preferred to continuously filter the coating composition through one or more filters to remove any possible gel particles which might be formed during the coating process.

An important requirement is that the plastic surface to be coated be substantially free of grease, dust and other contaminants which might interfere with the wetting of the composition on the substrate and the subsequent adhesion thereof during cure. Preferred cleaning procedures include cleaning by ultrasonic cleaning methods to which a detergent has been added, followed by rinsing with water. It has been found that the use of the composition according to the invention does not require elaborate cleaning procedures even when the composition is applied to a polycarbonate substrate which has been such a problem in the past. Also, in order to prevent substantial condensation of the composition during the coating process, it is preferred to keep it at a low temperature, for example, approximately 40 degrees Fahrenheit to 50 degrees Fahrenheit.

The thickness of the coating will be determined by the viscosity of the coating composition, which is generally a function of the temperature of the coating as well as the total solids content of the composition, and the degree of condensation or polymerization of the resinous material. It has been found that a film thickness in the range of two to about ten microns is within acceptable limits. However, it is preferred to have a film thickness lying in the range of between four and six microns with five microns being the most preferred. Naturally, the manner of coating of the substrate will also affect the thickness. For example, spray coating would require a higher solvent and lower solids content than would a method employing flow coating, for example. When film thickness is greater than about six microns, the abrasion resistance is increased but the impact and weathering resistance of the coating is lessened. Below about two and a half to two microns of thickness, the desired abrasion resistance is not achieved.

After application of the coating composition to the substrate, the substrate should be permitted to reach a tack free point prior to oven cure. Naturally, this will vary with the type of coating method which is used and generally is within a few minutes to as long as approximately ten minutes depending upon the ambient temperature, as well as the temperature of the substrate prior to coating. For example, if the plastic has been rinsed in hot water, then the tack free time will be reached in a more rapid period of time than with plastics that have been coated from lower temperatures.

Cure is a function of temperature and time with the appropriate cure time being selected for the plastic or other substrate which has been coated. As an example, polycarbonate can be cured at six to seven hours at two hundred fifty degrees Fahrenheit, acrylics and polymerizable allyl diglycol carbonate casting resins and cellusosics cure at one hundred and eighty degrees Fahrenheit for about sixteen hours, cast polyesters at one hundred fifty degrees Fahrenheit for twenty four hours, and styrenics at the same temperature and time.

As previously mentioned, if faster cure times are desired for lower temperatures, a suitable catalyst can be included to accelerate cure times.

The following examples are given for purposes of illustrating the invention and are not intended to constitute a limitation thereof.

EXAMPLE 1

A commercially available silica hydrosol-silanol partial condensate dispersed in an alcohol-water solution and sold by the Dow Chemical Company as "ARC" resin No. Q-9-6312 was allowed to come to room temperature. Three gallons of the silica hydrosol-silanol partial condensate was placed in a five gallon open container, equipped with a stirrer. The silica hydrosol-silanol polycondensate had the following product characteristics:

| PROPERTY | NUMBER |
| --- | --- |
| Solids Content | 35% |
| n-butanol | About 20% |
| Isopropanol | About 25% |
| Methanol | About 5% |

-continued

| PROPERTY | NUMBER |
|---|---|
| Boiling Point | About 150 degrees F. |
| Vapor Pressure | About 1 mm. |
| HG. Vapor Density | Greater than 1 |
| Solubility in Water | Greater than 50% |
| Specific Gravity (water equals 1) | An average of 1.04% |
| Volatile by volume | 50% |
| Evaporation Rate (ether equals 1) | Less than 1 |
| Flash Point-Closed Cup | About 90 degrees F. |
| Water | About 10–17% |
| Viscosity at 25 degrees C. Brookfield | 8–15 cps. |

One quart of the above silica-silanol partial condensate was removed and placed in a one gallon container. To this was added with stirring 240 gm. or about 5.12% by weight based on the solids content of the silica hydrosol-silanol partial condensate, of a methylated melamine formaldehyde resin sold by American Cyanamid Company under the designated name "Cymel 370." The methylated melamine formaldehyde resin had the following product characteristics:

| PROPERTY | NUMBER |
|---|---|
| Solids Content | 88% |
| Solvent | Isopropanol-isobutanol |
| Free Formaldehyde | 0% |
| Viscosity at 25 degrees C. (Gardner-Holdt) | $Z_2$–$Z_4$ |
| Color Gardner 1963, max. 1 Lbs./Gallon | (Approx.) 9.8 |
| Flash Point Closed Cup | 72 degrees F. |
| Moleculer Size | Polymeric |
| Methylol Content | High |
| Alkylation Alcohol | methanol |

Stirring was performed until an appearance of a homogeneous mixture was achieved approximately in two hours. At the end of this time, the mixture was added to the original three gallon mixture in the five gallon container and the resulting composition stirred for twenty four hours. When stirring was complete, the mixture was chilled to forty-five degrees Fahrenheit, at which point it was ready for use in coating. The resulting composition had a Brookfield viscosity of 10.8 cps.

The composition was placed in a coating bath maintained at a temperature in the range of forty to forty five degrees Fahrenheit. Prior to use of the composition, it was filtered through a series of filters, the smallest being a 1.2 micron filter. Filtration was continued throughout the coating process to remove any gel particles which might have formed.

Lenses which had been injection molded from polycarbonate were cleaned first by immersion in an ultrasonic hot water bath to which a detergent had been added and subjected to cleaning at forty KiloHertz, followed by immersion in hot water to rinse the hot lenses. The lenses were than allowed to air dry, followed by immersion in the coating composition. Dip coating into the coating composition was done by lowering the hot lenses into the coating bath at a very slow constant rate in order to provide a continuous coating on the surfaces thereof. Withdrawal of the lens was made in the same manner.

A tack free condition of the coating was achieved in a few minutes, after which the lenses were placed in an oven where they were heated to a temperature of two hundred fifty degrees Fahrenheit for six hours.

The polycarbonate lenses containing the cured coating composition of the invention were then subjected to abrasion and adherence tests.

A reciprocating machine having a surface following the curve of the lens, and equipped with a 0000 steel wool pad, was used to stroke the surface of the coated lens. The number of strokes on the surface of the lens without scratching is a measure of the abrasion resistance of the coating. It is desirable to have an average hardness of more than forty strokes on the surface coating. All of the coated lens samples had over forty strokes.

Adhesion of the coating was measured by applying a strip of "3M Scotch" No. 650 brand tape made by the 3M Company to a one-eighth inch crosshatched grid of the surface of the coating. The tape was then rapidly pulled off the crosshatched surface and any lack of adhesion would be apparent by removal of the coating from the surface. All of the polycarbonate lenses which were coated with the composition of the invention passed this test. Thus, the above example demonstrates the superior adhesion qualities of the abrasion coating composition, while maintaining high abrasion resistance by a method which does not require elaborate surface preparation of the polycarbonate plastic lenses prior to coating. This represents a time and equipment savings so that lenses can be produced at reduced costs in comparison with prior art methods. At the same time, the products are superior by virtue of the improved adhesion and aging characteristics over prior art coatings.

EXAMPLE 2

Substantially the procedure of Example 1 was repeated with the exception that five batches of the coating composition were made, each having varying percentages by weight, based on the "ARC" solids content of the methylated melamine resin coating "Cymel". The first batch included 3.8% "Cymel 370", the second batch contained 5.7% "Cymel 370", the third 7.5% of the "Cymel 370", the fourth contained 12.5% of the "Cymel 370" and the fifth contained 20% of the "Cymel 370". The resulting compositions were used for dip coating lenses made from a polycarbonate known by the trade name "Lexan" from the General Electric Company and from polycarbonate known by the trade name "Merlon" from Mobay Chemical Co. The lenses having the coating contining 3.8% "Cymel 370" failed. The lenses having the coating thereon which had 5.7% of the "Cymel" had properties comparable to that of Example 1 with the exception that a seven hour cure was required to give the same hardness. The remaining lenses coated with compositions containing 7.5%, 12.5% and 20% of the methylated melamine formaldehyde resin "Cymel 370" were characterized by increasingly reduced hardness, as compared with the coated lenses of Example 1. This Example shows that for optimum qualities, in the coating composition that the amino resin or alkylated amino resin should be added in an amount within the range of about 5% to about 8% by weight of the silica hydrosol-silanol partial condensate solids content.

EXAMPLE 3

Substantially the procedure of Example 1 is repeated with the exception that a methylated urea formaldehyde resin sold under the trade name "Beetle 60" by the American Cyanamid Company is substituted for the "Cymel 370" of Example 1. The "Beetle 60" resin has the following properties:

| PROPERTY | NUMBER |
|---|---|
| Solids Content | 88% |
| Solvent | Isopropanol |
| Free Formaldehyde | 0% |
| Viscosity at 25 degrees C. (Gardner-Holdt) | X-Z |
| Color Gardner 1963 Max.Lbs.Gal. (Approx.) | 9.8 |
| Flash Point degrees F. Closed Cup | 96 |
| Molecular Size | Dimer |
| Methylol Content | High |
| Alkylation Alcohol | Methanol |

The resulting compositions are used to coat "Lexan" polycarbonate lenses and "CR-39", (Polymerized allyldiglycolcarbonate plastic available from Pittsburgh Plate Glass Company). The "Lexan" polycarbonate lenses are cured at 250 degrees Fahrenheit for six hours and the "CR-39" coated lenses are cured at 180 degrees Fahrenheit for ten hours. The abrasion resistance and adhesion of the coating on these lenses are found to be excellent.

EXAMPLE 4

The procedure of Example 3 is repeated with the exception that in place of the "Beetle 60" resin additive, there is used 5% by weight, based on the solids content of the silica hydrosol-silanol partial condensate, made up of one part by weight of the methylated melamine formaldehyde resin "Cymel 370" and four parts by weight of the methylated urea formaldehyde resin "Beetle 60". The coating composition is used to coat "Lexan" polycarbonate lenses and "CR-39" cast polycarbonate lenses following the procedure of Example 1 and the cure times of Example 3. The abrasion resistance and adhesion are found to be comparable to that obtained for Example 1.

EXAMPLE 5

The procedure of Example 1 is repeated substituting "ARC" resin No. X-9-6130 containing 22.5% solids for the ARC resin Q-9-6312 of Example 1 and formulating three different coating compsitions, each having a different alkylated amino resin additive. The first composition contains five percent by weight, based on the ARC solids content of "Cymel 303". The second coating composition contains five percent by weight of "Cymel resin 325" based on ARC solids content. The third composition contains five percent by weight based on the "ARC" solids content of "Cymel 1116". The properties of these resins are given below.

| PROPERTIES | CYMEL 303 | CYMEL 325 | CYMEL 1116 |
|---|---|---|---|
| Resin type | Melamine | Melamine | Melamine |
| Solids % | 98 min. | 80 + 2 | 98 min. |
| Solvent | — | Isobutanol | — |
| Free Formaldehyde % | 0.5 max. | — | 0.3 max. |
| Viscosity, 25 degrees C. Gardner-Holdt | X-Z$_2$ | W-Z | U-Y |
| Color,Gardner 1963 Max. | 1 | 1 | 1 |
| Lbs.Gal.(Approx.) | 10 | 9.3 | 9.4 |
| Flash Pt. degrees F. Closed Cup | 200 | 112 | 200 |
| Molecular size | Monomine | Polymeric | Monomeric |
| Methylol Content | Very low | Low | Very low |
| Alkylation Alcohol | Methanol | Methanol | Methanol/ethanol |

The resulting compositions are used to spray coat clear sheets of acrylic "Lexan" polycarbonate, and "CR-39" polycarbonate Tests for abrasion resistance and adhesion show all of these coatings to be excellent.

EXAMPLE 6

The procedure of Example 1 is repeated to make up two coating compositions: the first replacing the "Cymel 370" with a benzoguanamine formaldehyde resin sold under the name "Cymel 1123" by American Cyanamid, and the other an n-butylated glycoluril amino resin sold under the name "Cymel 1170" by American Cyanamid Company. The resins are characterized by the following properties:

| PROPERTIES | "CYMEL 1123" | "CYMEL 1170" |
|---|---|---|
| Resin Type | Benzoguanamine | Glycoluril |
| Solids % | 98 min. | 97 + 2 |
| Solvent | — | — |
| Free Formaldehyde % | 0.3 max. | — |
| Viscosity 25 degrees C. Gardner Holdt | Z,-Z$_3$ | T-W |
| Color, Gardner 1963,max | 1 | 2 |
| Lbs./Gal. (Approx.) | 9.7 | 8.9 |
| Flash Point degrees F. Closed Cup | >200 | >200 |
| Molecular Size | Monomeric | Monomeric |
| Methylol Content | Very low | Very low |
| Alkylation Alcohol | Methanol/ethanol | n-butanol |

The resulting compositions are used to coat acrylic panels and cast polyester panels which are cured at 180 degrees Fahrenheit for ten hours for the acrylic panels and 150 degrees Fahrenheit for the cast polyester panels for a period of time of sixteen hours. The cured coating on the surface of the plastic sheet is found to exhibit excellent abrasion and adhesion qualities.

EXAMPLE 7

The proceedure of Example 5 is repeated using the "ARC" resin X-9-6130 and using as the amino resin a commercially available urea formaldehyde resin having water solubility. The urea formaldehyde resin is included in the composition in the amount of 5.5% by weight based on the solids content of the "ARC" resin. The resulting composition is used to spray coat acrylic panels, aluminum sheets, ceramic tile surfaces and sheet glass. The coated acrylic panels are cured at one hundred eighty degrees Fahrenheit for twelve hours, while the aluminum, ceramic, and glass material is cured at two hundred sixty degrees Fahrenheit for five and a half hours. The resulting cured coatings are found to exhibit excellent abrasion and adhesive qualities.

EXAMPLE 8

The procedure of Example 1 is repeated substituting five percent by weight based on the solids content of the silica hydrosol-silanol partial condensate of a melamine formaldehyde resin which has been condensed to the water dispersable stage. The resulting coating composition is used to dip coat panels of "Lexan" polycarbonate, "CR-39" casting resins, and butadiene-styrene polymer sold under the trade name "K-RESIN-BDF" polymer. The coated panels of polycarbonate are cured at two hundred fifty degrees Fahrenheit for six hours while the "CR-39" and the polystyrene are cured at one hundred fifty degrees Fahrenheit for twenty hours. The resulting cured coatings on the panels are found to exhibit excellent adhesion and abrasion resistance.

Various modifications are contemplated and can be resorted to by those skilled in the art without departing from the spirit and scope of the invention as defined by the following appended claims.

I claim:
1. In a coating composition which comprises:
a pigment-free aqueous composition comprising a dispersion of colloidal silica in a lower aliphatic alcohol-water solution of the partial condensate of a silanol of the formula $RSi(OH)_3$ in which R is selected from the group consisting of alkyl radicals of 1 to 3 inclusive carbons, the vinyl radical, the cyanoethyl radical, the 3,3,3-trifluoropropyl radical, the gamma-glycidoxypropyl radical, at least 70 weight percent of the silanol being $CH_3Si(OH)_3$, said composition containing 10 to 50 weight percent solids consisting essentially of 10 to 70 weight percent colloidal silica and 30 to 90 weight percent of the partial condensate, said composition containing sufficient acid to provide a pH in the range of about 3.0 to about 6.0;
the improvement which comprises:
from about 3.5 percent to about 20 percent by weight based on the solids content of the silica-silanol dispersion of a pigment-free resin selected from the group consisting of amino resins and amino resins which have been at least partially alkylated with at least one aliphatic alcohol having from 1–8 carbons, and mixtures thereof, said resin being dispersible in said silica-silanol dispersion.

2. An improved coating composition as claimed in claim 1 wherein:
about 20 to about 75 weight percent of the alcohol-water cosolvent is comprised of alcohol.

3. An improved coating composition as claimed in claim 2 wherein:
at least 50 weight percent of the alcohol is isopropanol.

4. An improved coating composition as claimed in claim 2 wherein:
said alcohol-water cosolvent system further includes up to about 20 weight percent of a water miscible polar solvent.

5. An improved coating composition as claimed in claim 2 wherein:
said acid is a water-miscible organic acid selected from the group consisting of acetic, formic, propanoic and maleic acids.

6. An improved coating composition as claimed in claim 5 further comprising:
from about 0.05 to about 1.5 weight percent of a buffered latent silanol condensation catalyst.

7. An improved coating composition as claimed in claim 5 wherein:
the partial condensate is of $CH_3Si(OH)_3$.

8. An improved coating composition as claimed in claims 2 or 7 wherein:
said partial condensate is present in an amount in the range of from about 40 to about 60 weight percent of the solids content of the silica-silanol dispersion; and wherein,
said resin is a urea-formaldehyde resin which has been at least partially alkylated with an aliphatic alcohol having from 1 to 4 carbon atoms.

9. An improved coating composition as claimed in claims 2 or 7 wherein:
said partial condensate of a silanol is present in an amount in the range of from about 40 to about 60 weight percent of the total solids of said silica-silanol dispersion; and wherein,
said resin is a melamine-formaldehyde resin which has been at least partially alkylated with at least one aliphatic alcohol having from 1 to 4 carbon atoms.

10. An improved coating composition as claimed in claim 8 wherein:
the lower aliphatic alcohol of the alcohol-water cosolvent system is a mixture of methanol, isopropanol, and n-butanol.

11. An improved coating composition as claimed in claims 2 or 7 wherein:
said partial condensate of a silanol is present in an amount in the range of from about 40 to about 60 weight percent of the total solids of said silica-silanol dispersion; and wherein,
said resin is a melamine-formaldehyde resin.

12. An improved coating composition as claimed in claims 2 or 7 wherein:
said partial condensate of a silanol is present in an amount in the range of from about 40 to about 60 weight percent of the total solids of said silica-silanol dispersion; and wherein,
said resin is a urea-formaldehyde resin.

13. An improved coating composition as claimed in claims 2 or 7 wherein:
said partial condensate of said silanol is present in an amount in the range of from about 40 to about 60 weight percent of the total solids of said silica-silanol dispersion; and wherein,
said resin is a benzoguanamine resin which has been at least partially alkylated with at least one aliphatic alcohol having from 1 to 4 carbon atoms.

14. A synthetic plastic surface having thereon a cured continuous coating of the coating composition as claimed in claim 1.

15. A plastic surface having thereon a cured continuous coating of the composition as claimed in claim 9.

16. A polycarbonate surface having thereon a cured continuous coating of the coating composition as claimed in claim 1.

* * * * *